United States Patent
Dai et al.

(10) Patent No.: US 8,993,953 B2
(45) Date of Patent: Mar. 31, 2015

(54) APPARATUS AND SYSTEM FOR MEASURING FLICKER OF DISPLAY PANEL

(71) Applicant: Shenzhen China Star Optoelectronics Technology Co., Ltd., Shenzhen, Guangdong (CN)

(72) Inventors: Ye Dai, Shenzhen (CN); Chih-tsung Kang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 270 days.

(21) Appl. No.: 13/811,284

(22) PCT Filed: Jan. 14, 2013

(86) PCT No.: PCT/CN2013/070400
§ 371 (c)(1),
(2) Date: Jan. 21, 2013

(87) PCT Pub. No.: WO2014/107896
PCT Pub. Date: Jul. 17, 2014

(65) Prior Publication Data
US 2014/0191118 A1 Jul. 10, 2014

(30) Foreign Application Priority Data
Jan. 9, 2013 (CN) .......................... 2013 1 0007749

(51) Int. Cl.
*G01J 1/04* (2006.01)
*G01J 1/42* (2006.01)
*G01J 5/08* (2006.01)
*G02F 1/13* (2006.01)

(52) U.S. Cl.
CPC .................................. *G02F 1/1309* (2013.01)
USPC .................... 250/227.11; 250/227.28; 385/12

(58) Field of Classification Search
USPC ......... 250/227.11, 227.28, 216, 208.1, 214.1, 250/214 R, 227.2; 385/4, 5, 8, 9, 12, 15, 385/115, 116
See application file for complete search history.

(56) References Cited

U.S. PATENT DOCUMENTS

2007/0145246 A1 * 6/2007 Roy et al. .................. 250/214.1
2009/0322664 A1 * 12/2009 Baek ............................... 345/94
2014/0209798 A1 * 7/2014 Woodward et al. ...... 250/227.28

* cited by examiner

*Primary Examiner* — Francis M Legasse, Jr.
(74) *Attorney, Agent, or Firm* — Andrew C. Cheng

(57) ABSTRACT

An apparatus and a system for measuring flicker of a display panel are disclosed. The apparatus comprises a light guide tube, a measuring probe for flicker measurement, and an optical device for diverging fight. The light guide tube comprises an opening at a first end and an opening at a second end. The trumpet-shaped light guide tube gradually enlarges from the opening at the second end to the opening at the first end. The opening at the first end is used for receiving light emitting from the periphery regions and the center region of the display. Light entering into the light guide tube through the opening at the first end emerges from the opening at the second end and is transmitted to the measuring probe through the optical device having a diverging effect. The more overall flicker information is acquired to improve the accuracy of measurement.

13 Claims, 1 Drawing Sheet

APPARATUS AND SYSTEM FOR MEASURING FLICKER OF DISPLAY PANEL

BACKGROUND OF THE INVENTION

1. Field of the Invention

The present invention relates to a measurement technology, more particularly, to an apparatus and a system for measuring flicker of a display panel.

2. Description of the Related Art

A flicker phenomenon in display panels has a significant impact on their display quality. Such a phenomenon in display panels will stimulate human visual system to cause eye discomfort, and a more serious flicker phenomenon will be harmful to human eyes. Therefore, it is necessary to measure the flicker in display panels during their processing. The flicker of a display panel is an important parameter in evaluating the character of the driving voltage of the display panel. By referring to the flicker in the display panel to adjust relevant parameters of the display panel, the flicker phenomenon is reduced, which is very meaningful eliminating image sticking of the display panel.

For typical size display panels, such as small and medium-sized display panels including a 28 inch display panel and a 32 inch display panel, a Color Analyzer CA310 is usually utilized to measure the flicker of the center point or other specific points of the display panel. Since the variations of voltage character between the center region and the periphery regions on the small and medium-sized display panel are relatively small, the flicker obtained by measuring the center point according to the above-mentioned method is thus representative of all points to allow the Vcom value all over the display panel adjusted based on the voltage character of the center point.

However, as the size of the display panel becomes larger and larger, for example large-sized display panels including a 46 inch display panel, a 55 inch display panel, a 66 inch display panel, and even a 70 inch display panel and a 90 inch display panel, gate lines in the left portion, the center portion, and the right portion of the panel will have different charging behaviors owing to RC delay. Or, the flicker level of the center region of the large-sized display panel is obviously different from that of the periphery regions because of the variation of charging characters of thin film transistors (TFTs) caused by the uniformity problem inherent to the TFT process of high-generation production lines. Therefore, the image sticking phenomenon tends to occur in the periphery regions of the display panel after prolonged use if the Vcom value of the display panel is adjusted only based on the flicker of the center point obtained from the above-mentioned measurement method. However, the image sticking phenomenon tends to occur in other regions if the Vcom value is adjusted based on the flicker of the periphery regions.

SUMMARY OF THE INVENTION

The present invention provides an apparatus and a system for measuring flicker of a display panel so that more overall flicker information is obtained to improve the accuracy of measurement without changing the current measuring probe for flicker measurement.

The present invention provides an apparatus for measuring flicker of a display panel. The apparatus comprises a light guide tube, a measuring probe for flicker measurement, and an optical device for diverging light. The light guide tube comprises an opening at a first end and an opening at a second end. The trumpet-shaped light guide tube gradually enlarges from the opening at the second end to the opening at the first end, and a diameter of the opening at the first end of the light guide tube is greater than or equal to a width of the display panel. An inner wall of the light guide tube is made of a material having high reflectivity, and the inner wall is an opaque reflective surface. The light guide tube is used for receiving light emitting from periphery regions and a center region of the display panel through the opening at the first end. The received light emerges from the opening at the second end and is transmitted to the measuring probe through the optical device. The optical device is on a light transmitting path between the opening at the first end and the measuring probe, and the measuring probe obtains flicker information of the periphery regions and the center region of the display panel based on the received light and acquires the flicker of the display panel based on the flicker information.

In one aspect of the present invention, the optical device is a biconcave lens located at the opening at the second end of the light guide tube. The opening at the first end of the light guide tube receives the light emitting from the periphery regions and the center region of the display panel. The received light emerges to the optical device through the opening at the second end and is transmitted to the measuring probe through the optical device.

In another aspect of the present invention, a diameter of the measuring probe is the same as a diameter of the opening at the second end and a diameter of the optical device.

The present invention also provides an apparatus for measuring flicker of a display panel. The apparatus comprises a light guide tube, a measuring probe for flicker measurement, and an optical device for diverging light. The light guide tube comprises an opening at a first end and an opening at a second end. The trumpet-shaped light guide tube gradually enlarges from the opening at the second end to the opening at the first end. The light guide tube is used for receiving light emitting from periphery regions and a center region of the display panel through the opening at the first end. The received light emerges from the opening at the second end and is transmitted to the measuring probe through the optical device. The optical device is on a light transmitting path between the opening at the first end and the measuring probe. The measuring probe obtains flicker information of the periphery regions and the center region of the display panel based on the received light and acquires the flicker of the display panel based on the flicker information.

In one aspect of the present invention, a diameter of the opening at the first end of the light guide tube is greater than or equal to a width of the display panel.

In another aspect of the present invention, an inner wall of the light guide tube is made of a material having high reflectivity, and the inner wall is an opaque reflective surface.

In still another aspect of the present invention, the optical device is a biconcave lens located at the opening at the second end of the light guide tube. The opening at the first end of the light guide tube receives the light emitting from the periphery regions and the center region of the display panel. The received light emerges to the optical device through the opening at the second end and is transmitted to the measuring probe through the optical device.

In yet another aspect of the present invention, a diameter of the measuring probe is the same as a diameter of the opening at the second end and a diameter of the optical device.

The present invention further provides a system for measuring flicker comprising a display panel and an apparatus for measuring flicker. The apparatus comprises a light guide tube, a measuring probe for flicker measurement, and an optical device for diverging light. The light guide tube comprises an opening at a first end and an opening at a second end. The trumpet-shaped light guide tube gradually enlarges from the opening at the second end to the opening at the first end. The light guide tube is used for receiving light emitting from periphery regions and a center region of the display panel through the opening at the first end. The received light emerges from the opening at the second end and is transmitted to the measuring probe through the optical device. The optical device is on a light transmitting path between the opening at the first end and the measuring probe. The measuring probe obtains flicker information of the periphery regions and the center region of the display panel based on the received light and acquires the flicker of the display panel based on the flicker information.

In one aspect of the present invention, a diameter of the opening at the first end of the light guide tube is greater than or equal to a width of the display panel.

In another aspect of the present invention, an inner wall of the light guide tube is made of a material having high reflectivity, and the inner wall is an opaque reflective surface.

In still another aspect of the present invention, the optical device is a biconcave lens located at the opening at the second end of the light guide tube. The opening at the first end of the light guide tube receives the light emitting from the periphery regions and the center region of the display panel. The received light emerges to the optical device through the opening at the second end and is transmitted to the measuring probe through the optical device.

In yet another aspect of the present invention, a width of the display panel is d, a distance from the display panel to the optical device is D, a focal length of the optical device is f, a diameter of the measuring probe is d, and a relationship between L, D, f, and d is $$\frac{2f}{d} = \frac{2(f+D)}{L}.$$

In contrast to the prior art, in the present invention apparatus for measuring flicker, the opening at the first end of the light guide tube is used for receiving light emitting from the periphery regions and the center region of the display. Light entering into the light guide tube through the opening at the first end emerges from the opening at the second end and is transmitted to the measuring probe through the optical device having a diverging effect. The trumpet-shaped light guide tube enlarging from the opening at the second end to the opening at the first end allows the light guide tube to effectively converge the light emitting from the periphery regions and the center region of the display so that brightness is improved. Owing to the divergent effect of the optical device, the view angle of the measuring probe is enlarged. Consequently, the more overall flicker information is acquired to improve the accuracy of flicker measurement. As a result, more accurate data is provided for the following flicker adjustment of the display panel.

DESCRIPTION OF THE EMBODIMENTS

The invention is illustrated in detail in consideration of the following detailed description of various embodiments of the disclosure in connection with the accompanying drawings.

Figure 1:
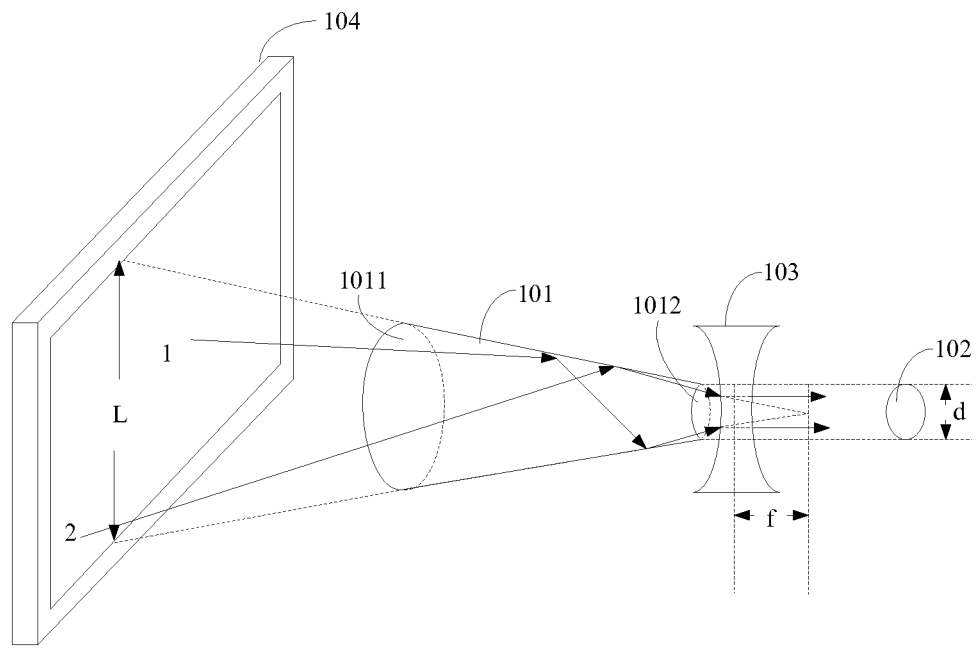
FIG. 1 is a schematic diagram showing a structure of an apparatus for measuring flicker of a display panel, according to an embodiment of the present invention.

Please refer to FIG. 1. FIG. 1 is a schematic diagram showing, a structure of an apparatus for measuring flicker of a display panel according to an embodiment of the present invention. The apparatus for measuring flicker comprises a light guide tube 101, a measuring probe 102 for flicker measurement, and an optical device for diverging light. According to the present embodiment, the optical device is a biconcave lens 103 having a divergent effect.

The light guide tube 101 comprises an opening at a first end 1011 and an opening at a second end 1012. The trumpet-shaped light guide tube 101 gradually enlarges from the opening at the second end 1012 to the opening at the first end 1011. The biconcave lens 103 is disposed outside of the light guide tube 101 and on the light transmitting path between the opening at the second end 1012 and the measuring probe 102. A diameter of the opening at the first end 1011 is the same as a width L of a display panel 104. When measuring the flicker of the display panel 104, the opening at the first end 1011 and the display panel 104 are face to face and the opening at the first end 1011 is used for receiving light emitted from periphery regions and a center region of the display panel 104. Take light 1 and light 2 for examples, the opening at the first end 1011 of the light guide tube 101 receives light 1 and light 2. Light 1 and light 2 then emerge from the opening at the second end 1012 and are transmitted to the measuring probe 102 through the biconcave lens 103. Of course, in other embodiments the diameter of the opening at the first end 1011 of the light guide tube 101 may be greater than the width of the display panel 104 so as to better collect light emitted from the display panel 104.

According to the optical principle for concave lenses, when the rays of light incident on a concave lens is a convergent beam of light and the focal point to which the convergent beam of light converges overlaps with the virtual focal point of the concave lens, the emergent light rays will be parallel after the convergent beam of light passing, through the concave lens. The cone angle of the light guide tube 101 is determined by the focal length f of the biconcave lens 103 and the diameter d of the measuring probe 102. Hence, when the light guide tube 101 has a proper cone angle, light 1 and light 2 converged by the light guide tube 101 will be transmitted to the biconcave lens 103. After light 1 and light 2 passing through the biconcave lens 103, parallel emergent rays of light will be transmitted to the measuring probe 102 so that the light beam received by the measuring probe 102 is more uniform. As a result, the accuracy of measurement is improved. The trumpet-shaped structure of the light guide tube 101 allows the light guide tube 101 to converge light rays so that brightness is improved. Consequently, brightness is not obviously reduced after light beam passing through the biconcave lens 103. Owing to the divergent effect of the biconcave lens, the measuring probe 102 has a wider view angle to receive light omitted from the periphery regions and the center region of the display panel 104.

The measuring probe 102 obtains the flicker information of the center region and the periphery regions of the display panel 104 based on the received light 1 and light 2 after receiving light 1 and light 2 transmitted from the light guide tube 101 and the biconcave lens 103. The flicker of the display panel 104 is acquired on the basis of the flicker information. The flicker measurement of the display panel 104 is thus completed. To avoid the interference of the ambient light, the apparatus for measuring flicker according to the present embodiment may be operated in a dark room. Moreover, an inner wall of the light guide tube 101 is made of a material having high reflectivity, and the inner wall is an opaque reflective surface. Therefore, light loss in the light guide tube 101 is decreased to decrease the deviation between the light intensity received by the measuring probe 102 and that emitted from the display panel 104. As a result, the measurement error is reduced.

In the apparatus for measuring flicker according to the present embodiment, the trumpet-shaped light guide tube 101 is able to converge light rays so that brightness is improved, in accordance with the above-mentioned, method. Hence, the light intensity sensed by the measuring probe 102 has less deviation. Furthermore, the divergent effect of the biconcave lens 103 will enlarge the view angle of the measuring probe 102. The measuring probe 102 is thus allowed to receive light emitted from the periphery regions and the center region of the display panel 104 to acquire more overall and accurate flicker information. Consequently, the flicker of the display panel 104 obtained from the flicker information is the overall flicker of the display panel 104, rather than the flicker in a particular region of the display panel 104. After that, the adjustment of the Vcom value is aimed at the whole display panel 104 when the Vcom value of the display panel 104 is adjusted based on the obtained flicker. The Vcom value to be adjusted is the optimized value for the whole display panel 104 rather than for part of the display panel 104. As a result, the image sticking phenomenon is reduced.

Figure 2:
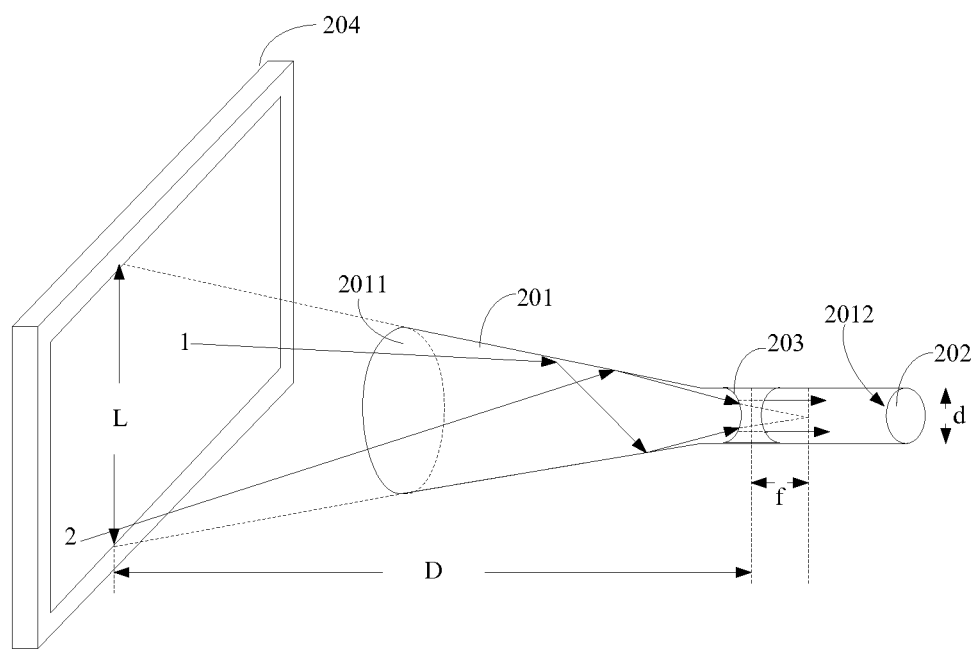
FIG. 2 is a schematic diagram showing a structure of an apparatus for measuring flicker of a display panel according to another embodiment of the present invention.

Please refer to FIG. 2, in order to reduce the interference of ambient light on the measurement as possible and prevent light rays collected by a light guide tube 201 from emanating to the surrounding environment, a biconcave lens 203 may be disposed in the light guide tube 201 and between an opening at a first end 2011 and an opening at a second end 2012 according to another embodiment of the present invention. Under the circumstances, a measuring probe 202 is located at the opening at the second end 2012. The light guide tube 201 gradually enlarges from a position corresponding to the biconcave lens 203 to the opening at the first end 2011 to form a trumpet-shaped structure therebetween, and is a uniform transmitting tube between the position corresponding to the biconcave lens 203 and the opening at the second end 2012. In this case, a diameter of the biconcave lens 203 is the same as a diameter of the opening at the second end 2012, and the opening at the second end 2012 of the light guide tube 201 is butt joined to the measuring probe 202. The diameter of the opening at the second end 2012 is the same as a diameter of the measuring probe 202. The diameter of both the measuring probe 202 and the opening at the second end 2012 is d. A width of the display panel 204 is L. A distance from the display panel 204 to the biconcave lens 203 is D. The diameter d of the measuring probe 202 and the focal length f of the biconcave lens 203 must satisfy the following relation formula:

$$\frac{2f}{d} = \frac{2(f+D)}{L}$$

When the biconcave lens 203 is disposed inside the light guide tube 201, the opening at the first end 2011 of the light guide tube 201 receives light rays emitted from the display panel 204. The emergent light rays will be parallel after the incident light rays are refracted by the biconcave lens 203, and then incident on the measuring probe 202 located at the opening at the second end 2012. Therefore, the light beam received by the measuring probe 202 is more uniform. The light transmitting path between the opening at the first end 2011 and the measuring probe 202 is within the light guide tube 201 and an inner wall of the light guide tube 201 is highly reflective and opaque to effectively decrease light loss. As a result, the measurement error is reduced.

Owing to the divergent effect of the biconcave lens, the view angle of the measuring probe 202 is enlarged. The measuring probe 202 is thus allowed to receive light emitted from both periphery regions and center region of the display panel 204, not only the light emitted from periphery regions or the center region. Consequently, the more overall flicker information is acquired to improve the accuracy of flicker measurement.

According to the above-mentioned embodiments, the optical device for diverging light is a biconcave lens. In other embodiments, the optical device may be other optical devices having a divergent effect, such as a plano concave lens.

A system for measuring flicker is further provided according to an embodiment of the present invention. The system for measuring flicker comprises a display panel and an apparatus for measuring flicker. The apparatus for measuring flicker is described in the above-mentioned embodiments.

Those skilled in the art will readily observe that numerous modifications and alterations of the device and method may be made while retaining the teachings of the invention. Accordingly, the above disclosure should be construed as limited only by the metes and hounds of the appended claims.

What is claimed is:

1. An apparatus for measuring flicker of a display panel, comprising a light guide tube, a measuring probe for flicker measurement, and an optical device for diverging light;
   the light guide tube comprising an opening at a first end and an opening at a second end, the trumpet-shaped light guide tube gradually enlarging from the opening at the second end to the opening at the first end, and a diameter of the opening at the first end of the light guide tube is greater than or equal to a width of the display panel;
   an inner wall of the light guide tube being made of a material having high reflectivity, and the inner wall being an opaque reflective surface;
   wherein the light guide tube is used for receiving light emitting from periphery regions and a center region of the display panel through the opening at the first end, the received light emerges from the opening at the second end and is transmitted to the measuring probe through the optical device, the optical device is on a light transmitting path between the opening at the first end and the measuring probe, and the measuring probe obtains flicker information of the periphery regions and the center region of the display panel based on the received light and acquires the flicker of the display panel based on the flicker information.

2. The apparatus as claimed in claim 1, wherein the optical device is a biconcave lens located at the opening at the second end of the light guide tube, the opening at the first end of the light guide tube receives the light emitting from the periphery regions and the center region of the display panel, and the received light emerges to the optical device through the opening at the second end and is transmitted to the measuring probe through the optical device.

3. The apparatus as claimed in claim 1, wherein a diameter of the measuring probe is the same as a diameter of the opening at the second end and a diameter of the optical device.

4. An apparatus for measuring flicker of a display panel, comprising a light guide tube, a measuring probe for flicker measurement, and an optical device for diverging light;

the light guide tube comprising an opening at a first end and an opening at a second end, the trumpet-shaped light guide tube gradually enlarging from the opening at the second end to the opening at the first end;

wherein the light guide tube is used for receiving light emitting from periphery regions and a center region of the display panel through the opening at the first end, the received light emerges from the opening at the second end and is transmitted to the measuring probe through the optical device, the optical device is on a light transmitting path between the opening at the first end and the measuring probe, and the measuring probe obtains flicker information of the periphery regions and the center region of the display panel based on the received light and acquires the flicker of the display panel based on the flicker information.

5. The apparatus as claimed in claim 4, wherein a diameter of the opening at the first end of the light guide tube is greater than or equal to a width of the display panel.

6. The apparatus as claimed in claim 4, wherein an inner wall of the light guide is made of a material having high reflectivity, and the inner wall is an opaque reflective surface.

7. The apparatus as claimed in claim 4, wherein the optical device is a biconcave lens located at the opening at the second end of the light guide tube, the opening at the first end of the light guide tube receives the light emitting from the periphery regions and the center region of the display panel, and the received light emerges to the optical device through the opening at the second end and is transmitted to the measuring probe through the optical device.

8. The apparatus as claimed in claim 7, wherein a diameter of the measuring probe is the same as a diameter of the opening at the second end and a diameter of the optical device.

9. A system for measuring flicker, comprising a display panel and an apparatus for measuring flicker, the apparatus comprising a light guide tube, a measuring probe for flicker measurement, and an optical device for diverging light;

the light guide tube comprising an opening at a first end and an opening at a second end, the trumpet-shaped light guide tube gradually enlarging from the opening at the second end to the opening at the first end;

wherein the light guide tube is used for receiving light emitting from periphery regions and a center region of the display panel through the opening at the first end, the received light emerges from the opening at the second end and is transmitted to the measuring probe through the optical device, the optical device is on a light transmitting path between the opening at the first end and the measuring probe, and the measuring probe obtains flicker information of the periphery regions and the center region of the display panel based on the received light and acquires the flicker of the display panel based on the flicker information.

10. The system as claimed in claim 9, wherein a diameter of the opening at the first end of the light guide tube is greater than or equal to a width of the display panel.

11. The system as claimed in claim 9, wherein an inner wall of the light guide tube is made of a material having high reflectivity, and the inner wall is an opaque reflective surface.

12. The system as claimed in claim 9, wherein the optical device is a biconcave lens located at the opening at the second end of the light guide tube, the opening at the first end of the light guide tube receives the light emitting from the periphery regions and the center region of the display panel, and the received light emerges to the optical device through the opening, at the second end and is transmitted to the measuring probe through the optical device.

13. The system as claimed in claim 12, wherein a width of the display panel is d, a distance from the display panel to the optical device is D, a focal length of the optical device is f, a diameter of the measuring probe is d, and a relationship between L, D, f, and d is $$\frac{2f}{d} = \frac{2(f+D)}{L}.$$

* * * * *